March 5, 1963 D. C. CROLL 3,080,113

SERIAL CARD READER

Filed Dec. 10, 1958 3 Sheets-Sheet 1

INVENTOR
DONALD C. CROLL
BY [signature]
ATTORNEY

March 5, 1963 D. C. CROLL 3,080,113

SERIAL CARD READER

Filed Dec. 10, 1958 3 Sheets-Sheet 2

United States Patent Office 3,080,113

Patented Mar. 5, 1963

3,080,113
SERIAL CARD READER

Donald C. Croll, Pleasant Valley, N.Y., assignor to International Business Machines Corporation, New York, N.Y., a corporation of New York Filed Dec. 10, 1958, Ser. No. 779,398
5 Claims. (Cl. 235—61.11)

This application relates to a reader of perforated statistical record cards and more particularly to a method of feeding said cards through the reader.

Many types of readers are well known in which the card or tape is fed past the sensing position by ratchets, intermittently operated clutches, feed rolls and the like. These all are subject to wear and eventually the card is no longer in register with the sensing means which, results in incorrect reading. Also in all normal forms of readers, the card must be positioned exactly with relation to the transporting medium or at least fed in synchronism with that medium.

It is therefore the principal object of this invention to provide a reader in which the document being sensed is fed in increments from one data or index position to the next.

Another object is to provide a feed for a reader in which indicia on a document controls the feed from index position to index position.

A further object is to provide a card reader in which the perforations control the incremental operation of a stepping motor feeding the card from one index position to the next.

A still further object of the invention is to provide a feed for a reader that does not require the card be in any fixed relation to the transporting medium.

Another object of the invention will be pointed out in the following description and claims and illustrated in the accompanying drawings, which disclose, by way of example, the principle of the invention and the best mode, which is contemplated of applying that principle.

Figure 1:
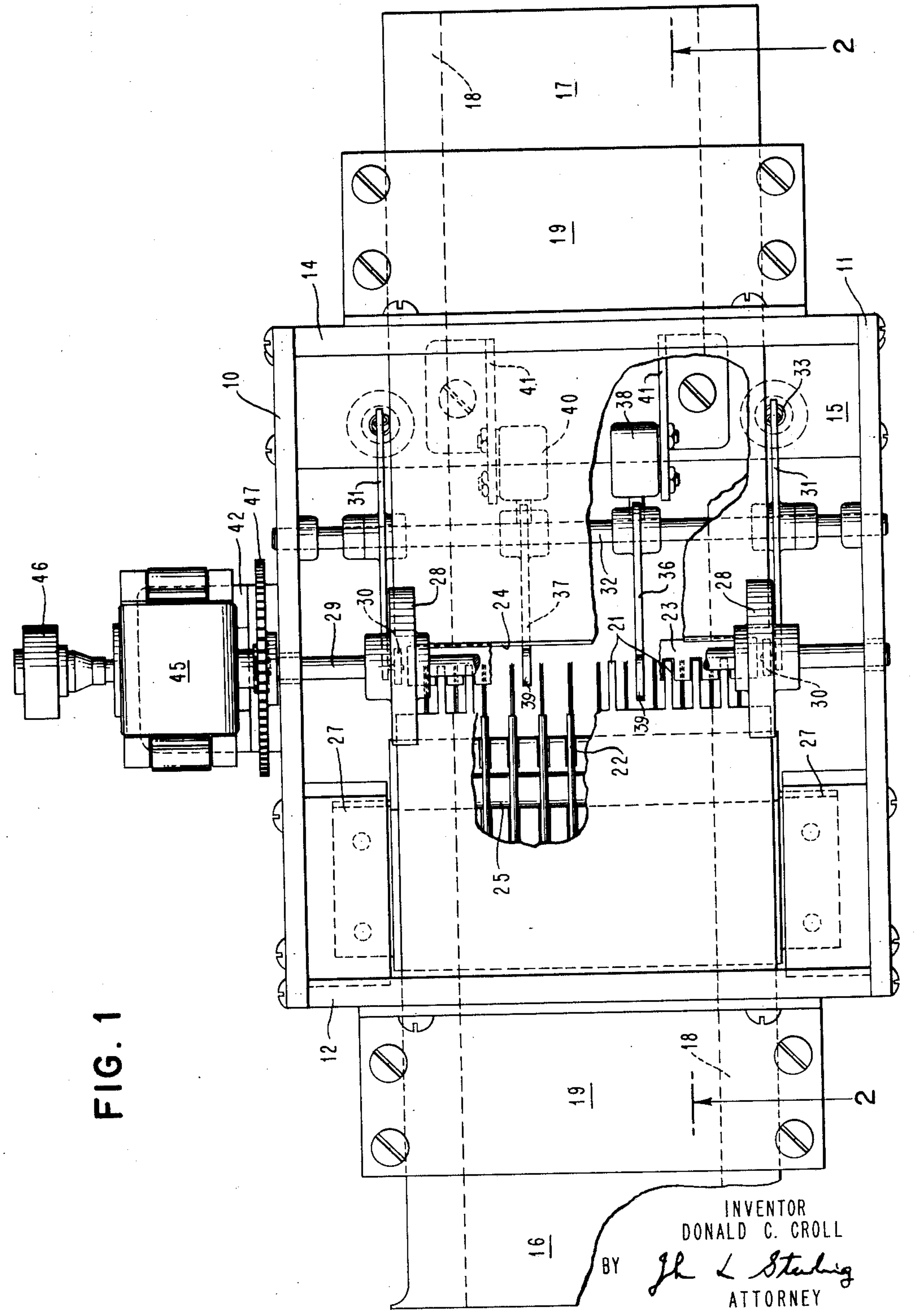
FIG. 1 is a plan view of the invention with portions cut away to more clearly show hidden parts.
Figure 2:
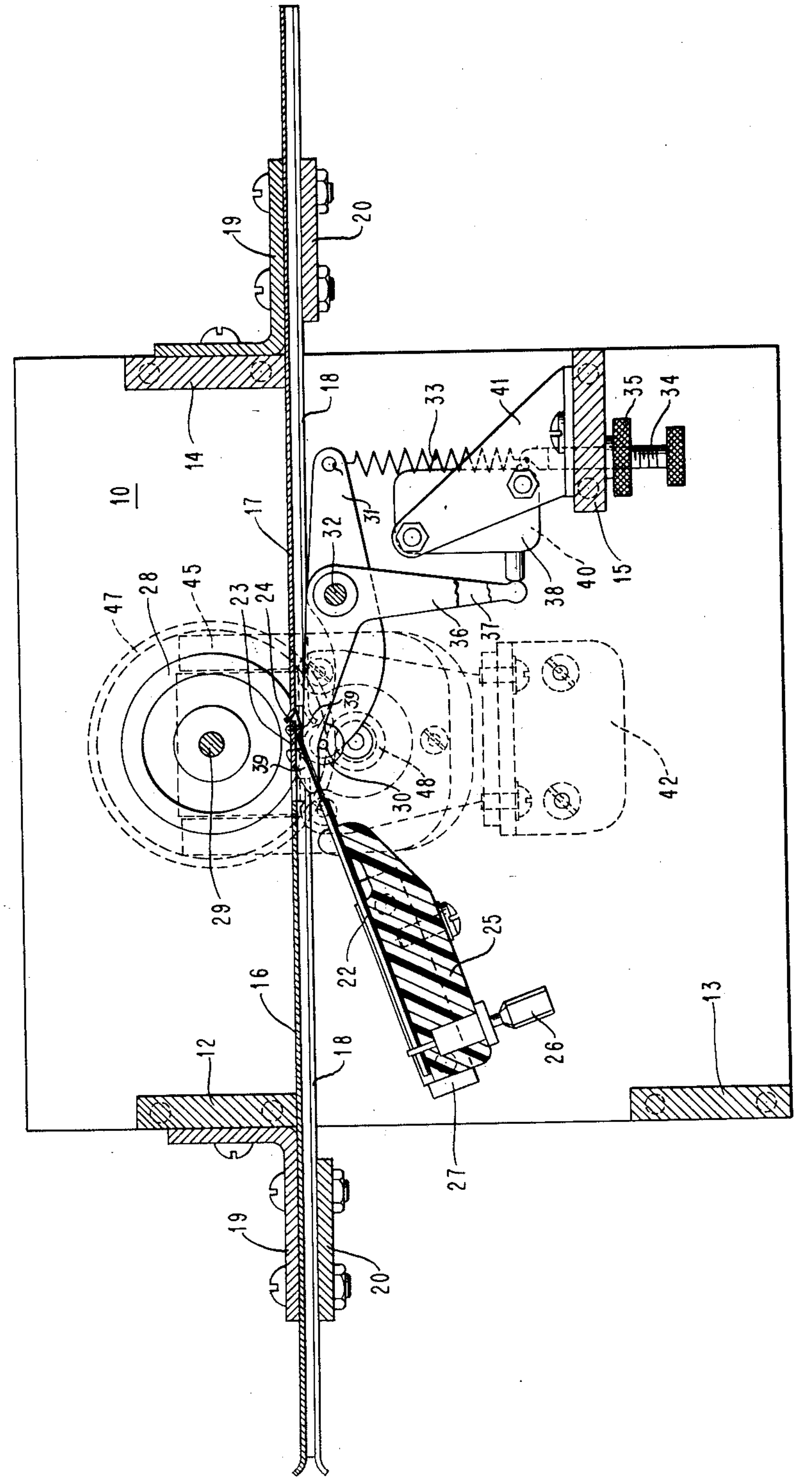
FIG. 2 is a cross section taken along line 2—2 of FIG. 1.

The reader may be mounted in a horizontal or vertical position, therefore no mounting means has been shown. The parts are carried in a frame comprising two side plates 10 and 11 secured together by cross bars 12, 13, 14 and 15. A card path is formed of two sheet metal plates 16 and 17 that are formed with inturned lips or guide members 18. The forward end of the plate 16 is flared as shown at the left of FIG. 1 to facilitate the insertion of a card. Plate 16 extends to the left beyond the plates 10 and 11 and is fastened to the cross bar 12 by an angle bracket 19 and clamping plate 20. Plate 17 extends to the right and is fastened to cross bar 14 by a similar bracket and plate. The upper righthand portion of the plate 16 is cut away to form a comb 21 to permit the sensing brushes 22 to engage a common contact bar 23 having slots therein to contain but not make contact with the teeth of comb 21. The upper left hand edge of plate 17 is formed with a flare or lip 24 to guide the leading edge of the card after passing the brushes.

The brushes are secured in a block 25 of insulating material by means of clamping screws 26 which also act as terminals. The block 25 is fastened to two plates 27 which are in turn adjustably secured to the plates 10 and 11.

The card to be read is manually fed through the card path 16 and thence through card path 17 by two feed rolls 28 secured on a shaft 29 journalled in the plates 10 and 11. The comb 21 is cut away at each end to permit the feed rolls 28 to contact the upper surface of the card. Each feed roll is provided with a friction surface which coacts with pressure rolls 30. The pressure rolls are carried on levers 31 rotatably mounted on a cross shaft 32 secured in the plates 10 and 11. Levers 31 are spring biased by springs 33 the tension of which is adjustable by means of machine screws 34 threaded in cross bar 15 and locked in adjusted position by a lock nut 35.

Also mounted for rotation on shaft 32 are two bell cranks 36 and 37 each having a cam shaped head 39 on the horizontal arm thereof; the horizontal arm of bell crank 36 being slightly longer than that of bell crank 37. The vertical arm of each bell crank cooperates with microswitches 38 and 40 respectively. Each microswitch is mounted on crossbar 15 by a bracket 41. The bell cranks 36 and 37 form card levers that are rocked when the edge of a card inserted in the card path 16 strikes the sloping surface of the camhead 39 thereby rocking first bellcrank 36 and then bellcrank 37 until each have closed their associated micro switches.

Mounted on a bracket 42 secured to the outer face of side plate 10 is a motor 45 which is described in detail in the U.S. patent to G. P. Fisher 2,834,896. The motor is a stepping or impulse motor actuated by alternating or intermittent currents. It starts and stops at each half cycle of current variation. The rotor is formed of soft iron and has a number of teeth preferably ten that rotate in a field of soft iron that is magnetized by a coil wound on one leg thereof and an adjustable permanent magnet. A positive half of an alternating current will form a magnetic path that rocks the rotor three eighths of a step and as the sine wave passes through zero the permanent magnet rocks the rotor one eighth of a step further to complete the rocking of the rotor. This whole operation has rotated the rotor one half step or one half tooth space. The negative half of an alternating current wave will now cause the rotor to rock a full step. From this it can be seen that the motor provides what is in effect a ratchet feed which can be stopped with little if any overthrow. The motor is also provided with a rotary dash pot 46 which as fully described in the above patent acts to dampen the rotor as an aid to instantaneous stopping. In other words for a given signal, the motor delivers a torque through a definite angle or in discrete steps.

The motor is connected to the feed roll shaft 29 through a reduction gearing 47 and 48 that insures that a feed roll of a certain diameter will feed the card a distance equal to that between columns of data perforations in a preselected number of steps or increments of motor rotation. In the example shown, the distance from the center of one column of perforations to the center of the adjacent column in a statistical card is .087 inch. The diameter of the feed roll 28, the ratio of the gears 47 and 48 are so related that the motor makes four full steps to feed the card from one column to the next.

Figure 3:
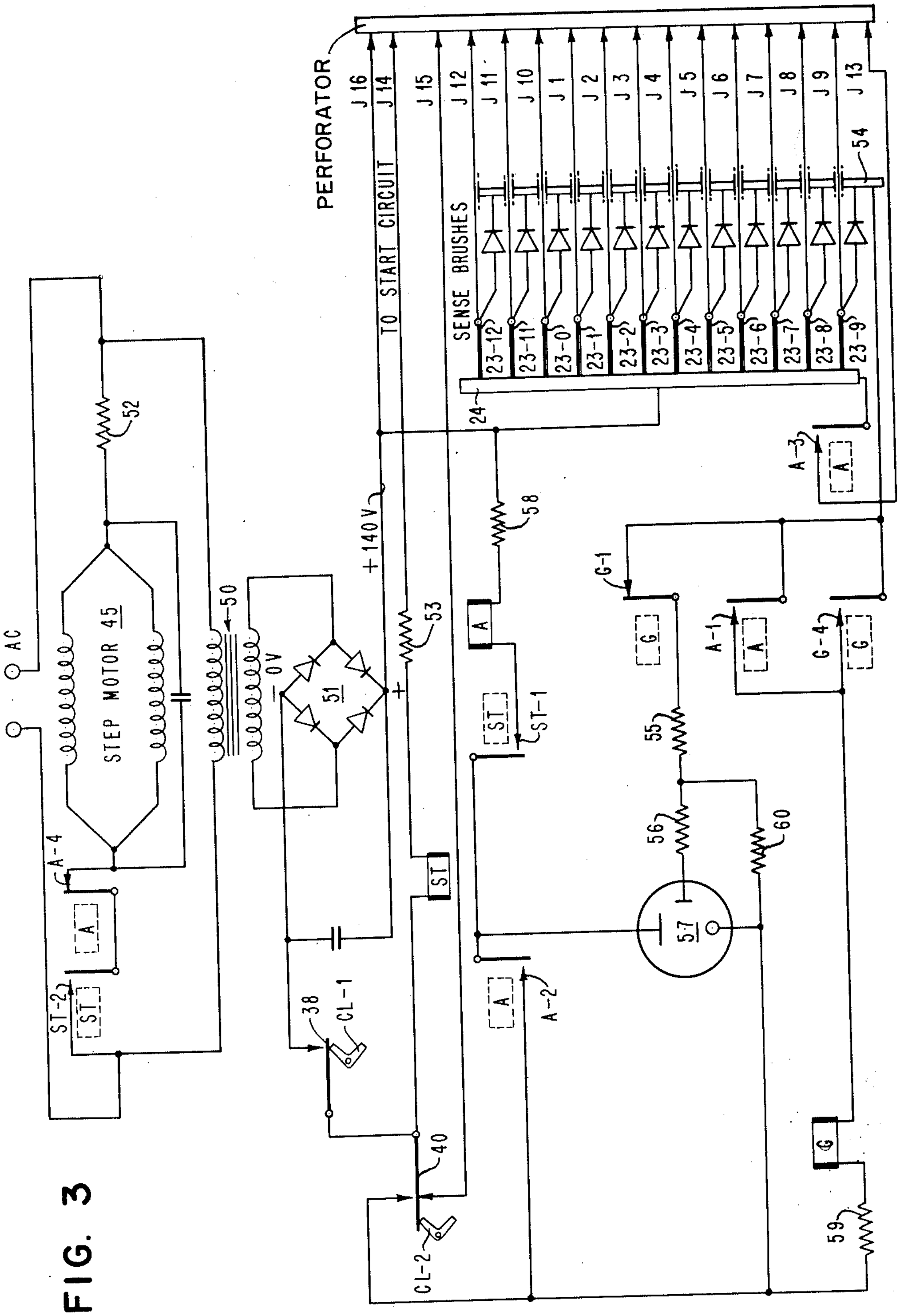
FIG. 3 is a schematic showing of the electrical circuit for operating the reader.

In operation, data sensed from a card is transmitted by cable to a separate and distinct slave machine such as a perforator, for either card or tape, a printer, calculator or other business machine or machine tool. The slave machine controls operation of the reader during entry of a sensed data bit by opening the motor circuit. During the reading of blank columns the motor circuit is maintained and the card is fed until a perforation is reached. Referring to FIG. 3, A.C. current is connected to the primary of transformer 50 the secondary of which is connected to a rectifier 51. The stepping motor 45 is connected across the A.C. line through a resistance 52 and the normally closed contact A–4 and the normally open contact ST–2. The contacts J1–J16 inclusive are connected by cable to the slave machine wherein if it is a perforator, such as that disclosed in U.S. Patent 2,647,581 to E. W. Gardinor et al., the contacts J1 to J12 are connected to the punch magnets. J–13 will be connected to the common for the punch magnets. J14 and J15 are connected to a start circuit in the perforator. J–15 is used to transmit an End of Card signal to the perforator when the card moves to a point where card lever 2 opens and card lever 1 remains closed.

In operation when a card is inserted card levers CL–1 and CL–2 (bell cranks 36 and 37) close switches 38 and 40 and the start relay ST is operated over a circuit from zero volts on rectifier 51, card lever switch 38, coil of relay ST, resistance 53, terminal J14 through the start circuit in the perforator returning over terminal J16 to the 140 volt terminal of rectifier 51.

The operation of relay ST closes the circuit for the stepping motor 45 at the ST–2 contact. The motor continues to step thus feeding the card until a perforation such as a five is sensed. At that time a circuit is closed from plus 140 volts on rectifier 51, contact roll 24, brush 23–5, diode to diode common 54 normally closed contact G–1 grid resistances 55 and 56 to the cathode of tube 57. This circuit impresses a plus potential on the starting anode to cause the tube to conduct and actuate relay A over a circuit through contact ST–1, coil of relay A, resistor 58 to plus 140 volts. The operation of relay A opens the motor circuit at contact A–4 thus stopping the feed. Also at contact A–3 140 volts is connected through roll 24, to terminal J–13 of the perforator to insure that a circuit will be maintained for the punch magnets while the card is stationary.

Contact A–1 closes a circuit for the relay G which extends from the negative on rectifier 51 card lever switch 38 make contact of card lever switch 40 resistor 59 coil of relay G contact A–1 to diode common 54 through the diode and brush 23–5 and through perforation five to common bar 24 to positive on the rectifier 51. The operation of relay G opens the circuit to tube 57 at contact G–1 thus preventing refiring of the tube. A hold circuit for relay G is established through contact G–4 which will hold after contact A–1 is opened. Contact A–2 establishes a hold circuit for relay A and shunts out the tube 57.

After the data bit has been entered in the slave machine the circuit for relay ST is momentarily opened in that machine. This action releases relay ST opening contact ST–1 thereby releasing relay A, which opens the shunt around tube 57, at contact A–2, removes current from terminal J13 at contact A–3, prepares the circuit for the motor 45 at contact A–4.

The reader continues to feed the card stopping momentarily to read each perforation but continuing over all blank columns until the last or eightieth column has been read. At this time the card passes from beneath card lever Cl–1 and the circuit from negative through resistances 60 and 55, contact G–1, diode common 54 to the brushes is opened to protect the brushes. Also at this time, a circuit is closed from negative, card lever switch 38, normally closed contact of card lever switch 40 terminal J–15 to the slave circuit indicating an end of a card. As the card continues, card lever switch 38 opens, opening the power circuit and shutting off the reader until another card is inserted.

From the above it is seen that a perforated card once inserted in the card path will be fed column by column under control of the perforations until all columns have been read. The feeding of the card will be stopped whenever a perforation is sensed to permit the slave machine to act and will feed past all blank columns on the card without stopping. This does away with the necessity of maintaining synchronism between machines since the slave machine controls the feed at the reader from signal to signal. Furthermore this insures that each signal is received by the slave machine since the restart signal for the feed must come from the slave machine.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a record reading mechanism connected to a slave machine, a stepping motor, a motor circuit, a means for sensing indicia on said record, a feeding means driven by said motor for feeding records through said sensing means, circuit means in said slave machine controlled by receipt of data from said sensing means, and a circuit containing said circuit means and said sensing means controlling the opening and closing of said motor circuit whereby a record is fed through said mechanism under control of said indicia.

2. In a record reading mechanism connected to a slave machine, a stepping motor, a motor circuit jointly controlled by contacts of a start relay and a supervisory relay, means for sensing data on said records, a feeding means driven by said motor for feeding records through said reading mechanism, a circuit containing said start relay and controlled by data received in said slave machine and record controlled contacts in said reader for completing said start relay circuit to close said motor circuit and a second circuit controlled by said sensing means for opening said motor circuit upon sensing data on a record to prevent feeding of said record under joint control of both said circuits.

3. In a record reading mechanism connected to a slave machine, a stepping motor, a motor circuit controlled by a start relay and a supervisory relay, means for sensing data on said records, a feeding means driven by said motor for feeding records through said sensing means, circuit means in said slave machine controlled by receipt of data from said sensing means, contacts controlled by the presence of a record in said reader, a circuit containing said circuit means for operating said start relay to close said motor circuit and a second circuit containing said presence contacts for said supervisory relay to close said motor circuit whereby a record is fed step by step through said mechanism under joint control of said relays.

4. In a record reading mechanism connected to a perforator a steeping motor, feeding means actuated by said motor, a motor circuit, recording means in said perforator, means for sensing data indicia on said record for actuating said recording means and means for opening said motor circuit upon sensing any data indicia to prevent operation of said feeding means until operation of said recording means is completed.

5. In a record reading mechanism for actuating a slave machine, a stepping motor, a motor circuit, means for sensing indicia on said record, recording means in said slave machine actuated by signals from said sensing means, and means in said slave machine controlled by said recording means for closing said motor circuit upon completion of the operation of said recording means.

References Cited in the file of this patent

UNITED STATES PATENTS

| | | |
|---|---|---|
| 2,401,021 | Rosenberg et al. | May 28, 1946 |
| 2,935,923 | Baumbach et al. | May 10, 1960 |